US012322242B2

(12) United States Patent
Ikeda et al.

(10) Patent No.: US 12,322,242 B2
(45) Date of Patent: *Jun. 3, 2025

(54) GAMING SYSTEMS AND METHODS FOR PROVIDING A TABLE GAME WITH VISUAL EFFECTS

(71) Applicant: INTERBLOCK D.O.O., Las Vegas, NV (US)

(72) Inventors: Hiromichi Ikeda, Tokyo (JP); Yoshihiro Nagasaki, Tokyo (JP); Katsuhiro Kido, Tokyo (JP)

(73) Assignee: INTERBLOCK D.O.O., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/470,222

(22) Filed: Sep. 19, 2023

(65) Prior Publication Data

US 2024/0005727 A1 Jan. 4, 2024

Related U.S. Application Data

(63) Continuation of application No. 17/383,271, filed on Jul. 22, 2021, now Pat. No. 11,798,352, which is a (Continued)

(51) Int. Cl.
*G07F 17/32* (2006.01)

(52) U.S. Cl.
CPC ........ *G07F 17/322* (2013.01); *G07F 17/3213* (2013.01); *G07F 17/323* (2013.01); (Continued)

(58) Field of Classification Search
None
See application file for complete search history.

(56) References Cited

U.S. PATENT DOCUMENTS 5,934,676 A 8/1999 Rubin
9,098,969 B2 8/2015 Mulligan
(Continued)

FOREIGN PATENT DOCUMENTS

CN 1833084 A 9/2006
CN 102026692 A 4/2011
(Continued)

OTHER PUBLICATIONS

International Search Report and Written Opinion dated Jul. 20, 2018 for PCT Application No. PCT/US2018/029652.
(Continued)

*Primary Examiner* — Ronald Laneau
(74) *Attorney, Agent, or Firm* — BakerHostetler

(57) ABSTRACT

In one aspect, an improved table game system is disclosed herein, which displays visual effects on a play surface. A game system comprising: a table top having a game play area, and a table support for supporting the table top, a dealer station, a display that covers at least a portion of the game play area, a projector assembly, the projector assembly including a projector and a projector mount that mounts the projector to the support frame at a mounting angle, and a processing system connected to the projector and the dealer station.

20 Claims, 8 Drawing Sheets

Related U.S. Application Data continuation of application No. 16/586,335, filed on Sep. 27, 2019, now Pat. No. 11,087,586.

(60) Provisional application No. 62/739,807, filed on Oct. 1, 2018.

(52) U.S. Cl.
CPC ...... *G07F 17/3239* (2013.01); *G07F 17/3241* (2013.01); *G07F 17/3244* (2013.01); *G07F 17/3288* (2013.01); *G07F 17/3293* (2013.01)

(56) References Cited

U.S. PATENT DOCUMENTS

| | | | |
|---|---|---|---|
| 10,460,554 B2 | 10/2019 | Stanford et al. | |
| 10,540,853 B2 | 1/2020 | Persson et al. | |
| 10,546,458 B1 | 1/2020 | Fujita et al. | |
| 10,922,927 B2 | 2/2021 | Persson et al. | |
| 11,049,361 B2 * | 6/2021 | Jackson | G07F 17/3211 |
| 11,341,807 B2 | 5/2022 | Feng et al. | |
| 2003/0151198 A1 | 8/2003 | Parra et al. | |
| 2004/0160005 A1 | 8/2004 | Krise et al. | |
| 2006/0068870 A1 | 3/2006 | Crawford, III et al. | |
| 2007/0004510 A1 | 1/2007 | Underdahl et al. | |
| 2007/0045959 A1 | 3/2007 | Soltys | |
| 2007/0145682 A1 | 6/2007 | Rowe et al. | |
| 2007/0259714 A1 | 11/2007 | Block et al. | |
| 2008/0076581 A1 | 3/2008 | Mattice et al. | |
| 2009/0108532 A1 | 4/2009 | Darling | |
| 2009/0118006 A1 | 5/2009 | Kelly et al. | |
| 2009/0131151 A1 | 5/2009 | Harris et al. | |
| 2009/0181744 A1 | 7/2009 | Yoshizawa | |
| 2009/0253478 A1 | 10/2009 | Walker et al. | |
| 2010/0130280 A1 | 5/2010 | Arezine et al. | |
| 2010/0222148 A1 | 9/2010 | Kuhn et al. | |
| 2010/0279757 A1 | 11/2010 | Glenn, II et al. | |
| 2011/0115158 A1 | 5/2011 | Gagner et al. | |
| 2014/0191474 A1 | 7/2014 | Linden | |
| 2014/0274252 A1 | 9/2014 | Chun | |
| 2014/0361485 A1 | 12/2014 | Pockaj | |
| 2014/0370980 A1 * | 12/2014 | Czyzewski | G07F 17/3211 463/31 |
| 2016/0012662 A1 | 1/2016 | Jackson et al. | |
| 2016/0051891 A1 | 2/2016 | Mulligan | |
| 2017/0084129 A1 | 3/2017 | Baerlocher et al. | |
| 2017/0270752 A1 | 9/2017 | Snow et al. | |
| 2020/0105087 A1 | 4/2020 | Ikeda et al. | |
| 2021/0150862 A1 | 5/2021 | Persson et al. | |
| 2023/0144768 A1 * | 5/2023 | Kitagaki | G07F 17/322 463/12 |

FOREIGN PATENT DOCUMENTS

| | | |
|---|---|---|
| FR | 2982109 A1 | 5/2013 |
| JP | 05-177056 A | 7/1993 |
| JP | 2009-165809 A | 7/2009 |
| WO | WO 2000/016863 A1 | 3/2000 |
| WO | WO 2008/030781 A2 | 3/2008 |
| WO | WO 2008/055286 A1 | 5/2008 |
| WO | WO 2009/061618 A1 | 5/2009 |
| WO | WO 2014/140512 A1 | 9/2014 |

OTHER PUBLICATIONS

United States Non-Final Office Action dated Nov. 6, 2020 for U.S. Appl. No. 16/586,335.

"What's the Deal With Rapid Craps?", Las Vegas Blog Staff in Gaming, Las Vegas Casinos, http://blog.caesars.com/las-vegas/gaming/whats-the-deal-with-rapid-craps/.

European Extended Search Report dated Mar. 31, 2020 for European Application No. 18790178.0.

Australian Examination report dated Jul. 6, 2020 and Nov. 24, 2020 for Australian Application No. 2018260722.

Canadian Office Action dated Jan. 4, 2021 for Canadian Application No. 3,061,477.

United States Office Action dated Apr. 19, 2019 for U.S. Appl. No. 15/963,922.

Macau Search Reports dated Jul. 13, 2022 for Macau Application Nos. I/001564(106) and U/000229(830).

* cited by examiner

GAMING SYSTEMS AND METHODS FOR PROVIDING A TABLE GAME WITH VISUAL EFFECTS

CROSS-REFERENCE TO RELATED APPLICATIONS

This application is a continuation of U.S. application Ser. No. 17/383,271 filed Jul. 22, 2021; which is a continuation of U.S. application Ser. No. 16/586,335 filed Sep. 27, 2019, now U.S. Pat. No. 11,087,586 issued Jul. 21, 2021; which claims the benefit of U.S. Provisional Application No. 62/739,807 filed Oct. 1, 2018; the contents of each of which are incorporated herein by reference in their entirety.

BACKGROUND OF THE INVENTION

Field of the Invention

The present disclosure relates to table game systems which can be used in wagering games.

Description of the Related Technology

Traditional table games typically involve a live dealer, a physical game component (e.g., playing cards, dice, etc.), and a static playing surface that provides guidance for the play of the game (e.g., felt with identifying player positions, game instructions, etc.). If operators wanted to modify the game offered on a traditional table game, for example offer a new side bet, they typically would have to remove the table from play, and replace the static playing surface. One way operators have chosen to avoid this hassle is by offering electronic table game ("ETG") systems, which typically remove the live dealer, the physical game component, and the static playing surface, and replace each of those components with virtual representations in an effort to make the associated game more efficient. In both of these typical arrangements, the players can wager something of value on the outcome of a game and potentially win an award if they have a winning outcome. While operators (e.g., casinos) appear to prefer ETG systems due to their efficiencies, players appear to prefer the physical attributes, such as holding physical cards, of a traditional table game.

It is therefore desired to provide a system that allows players to continue to play with physical game components while also providing operators a more efficient gaming table.

SUMMARY

The present disclosure includes a game system that can have a table top having a game play area, and a table support for supporting the table top. A dealer station can be adjacent to at least one side of the game play area, the dealer station can include a dealer interface for supporting game play of the gaming system. A display can cover at least a portion of the game play area, the display can include at least one support layer and a play surface and the play surface can be positioned on top of the support layer(s). A projector assembly can include a projector and a projector mount that mounts the projector to the support frame at a mounting angle. The projector can be configured to project light to the support layer such that images from the light are transmitted through the support layer and are displayed on the play surface on the opposite side from the support layer. A processing system can be connected to the projector and the dealer station. The processing system can include a processor, a memory, and a graphics unit. The processing system can run a game program stored in the memory and can send media data to the projector assembly through the graphics unit for display as game play images on the play area during game play.

It should be understood that various changes and modifications to the embodiments described herein will be apparent to those skilled in the art. Such changes and modifications can be made without departing from the spirit and scope of the present subject matter and without diminishing its intended advantages.

DESCRIPTION

Brief Description of the Drawings

Some implementations of the present disclosure are described with respect to the following figures.

Figure 1:
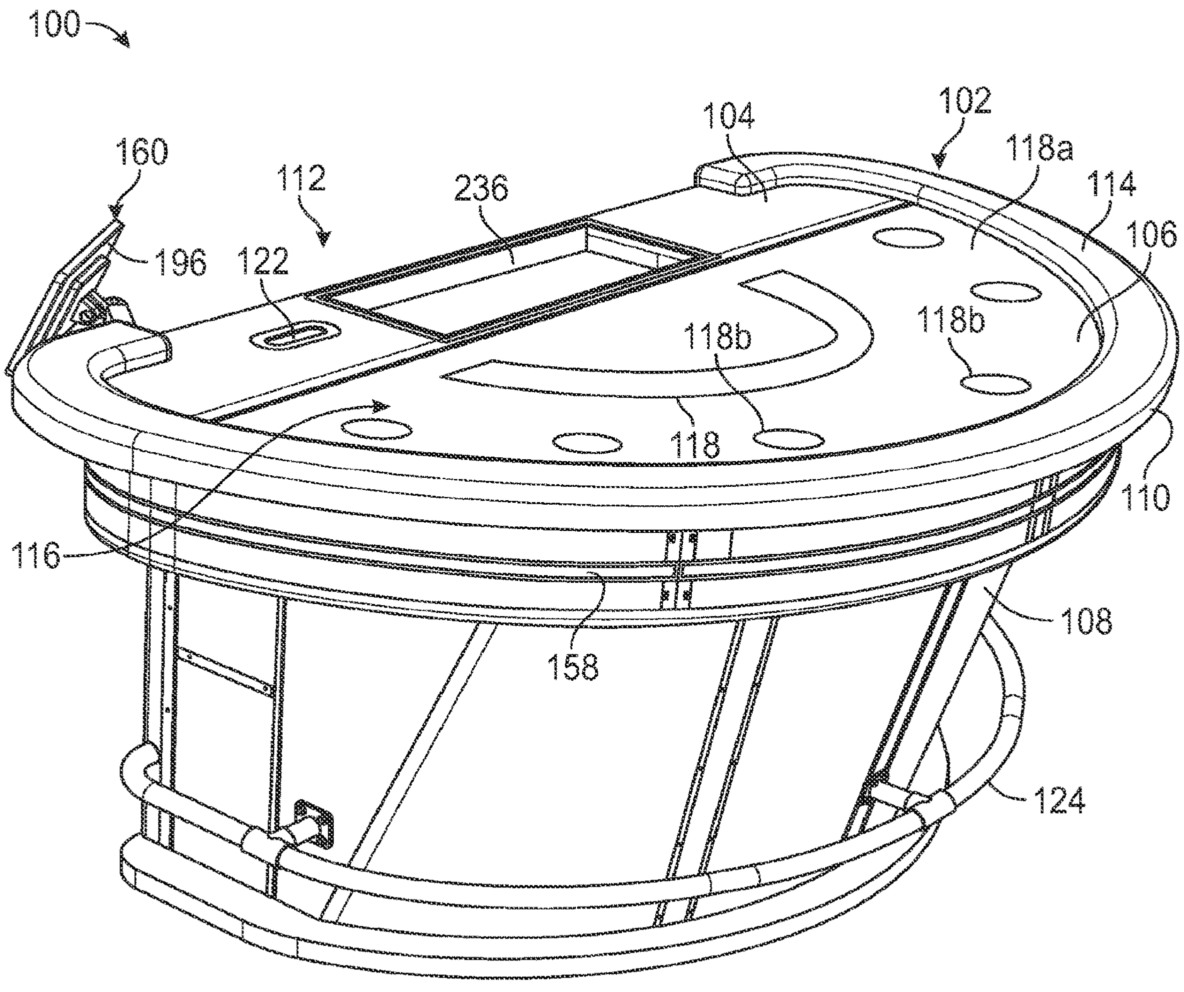
FIG. 1 depicts a perspective view of a table gaming system, in accordance with one or more embodiments.

Throughout the drawings, identical reference numbers designate similar, but not necessarily identical, elements. The figures are not necessarily to scale, and the size of some parts may be exaggerated to more clearly illustrate the example shown. Moreover, the drawings provide examples consistent with the description; however, the description is not limited to the examples provided in the drawings.

DETAILED DESCRIPTION

FIG. 1 depicts a perspective view of one embodiment of an electronic wagering table game system 100, according to one or more embodiments. The table game system 100 can be generally configured for use in playing a casino type table game, such as blackjack, pal gow poker, baccarat, three card poker, and/or others. The table game system 100 can include a table top 102 having an upper surface 104 with a game play area 106 that can cover all or part of the upper surface 104. The table top 102 can be supported on a table support 108. One or more players can stand or sit around an edge 110 of the table top 102 and a dealer can deal or otherwise control game play from a dealer station 112 of the table game system 100. The player side of the edge 110 can include an arm rest or bumper 114 which can have padding or cushion upon which the players can comfortably lean while playing the game, and which may prevent accidental spilling of game play components, such as cards, dice, or wagering chips, onto the floor. The game can involve one or more of the players placing something of value at risk—a wager—on an outcome that is unknown and uncertain to the player. In one or more embodiments, the dealer can deal cards to the players from a shoe to the players at different parts of the game play area 106 in front of each of the players and in front of the dealer. The outcome of the game play can be determined by the cards dealt to the players and to the dealer. The dealer can control the game from the dealer station 112 and the dealer station 112 can assist the dealer in the game play.

A display area 116 can cover all or part of the upper surface 104 of the table top 102. The display area 116 can include all or part of the game play area 106. The display area 116 can show images 118 that can be used for representing game play elements, instructing players about game rules, for attracting players to the gaming system and/or for other purposes. In one or more embodiments, the images 118 can be generated and displayed as part of the game and/or can be generated and displayed under the control of the dealer from the dealer station 112. In one or more embodiments, the images 118 can be generated by the table gaming system 100 and/or by an external system 120 (FIG. 3) that is external to the table gaming system 100. The table game system 100 can include a drop box 122. The table game system 100 can also include a foot rest 124.

Figure 2:
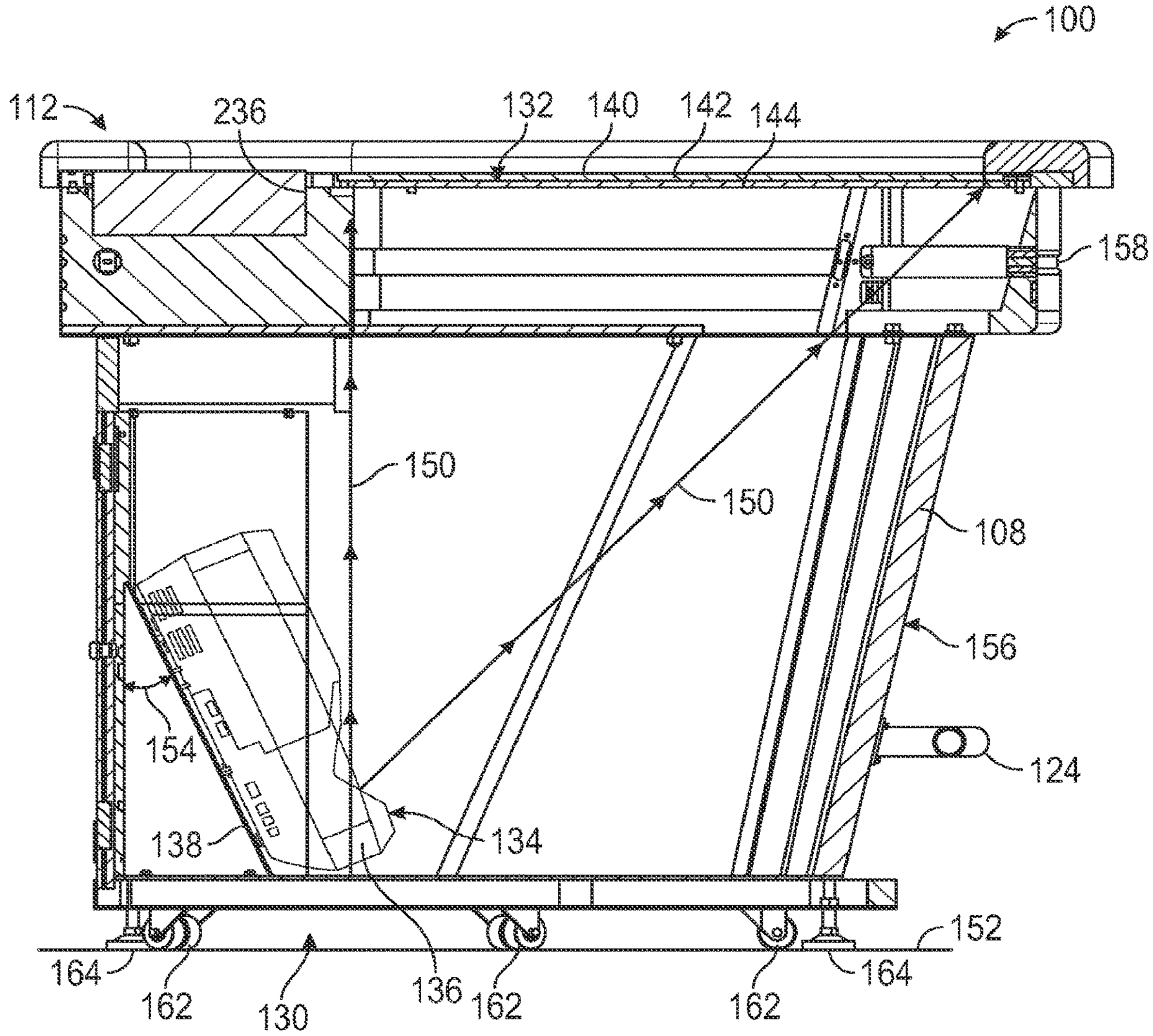
FIG. 2 depicts a side cut away view of the table gaming system, in accordance with one or more embodiments.

FIG. 2 depicts a side cut away view of the table gaming system 100, in accordance with one or more embodiments. The table game system 100 can include a display system 130 which can include a display assembly 132 and a projector assembly 134. The projector assembly 134 can include a projector 136 and a projector mount 138 that can position the projector in the table game system 100. The projector 136 is positioned in the table game system 100 to project the images 118 on the display assembly 132 which can define the display area 116.

The display assembly 132 can include a play surface 140 and one or more support layers which can support the play surface 140. In an embodiment shown in FIG. 2, the play surface 140 can be positioned on a flexible protective layer 142 and the flexible protective layer 142 can be positioned on a glass support layer 144. In an embodiment, the play surface 140 can be directly on top of the flexible protective layer 142. In an embodiment, the play surface 140 can be secured to the flexible protective layer 142 using an adhesive. The flexible protective layer 142 can be transparent and can provide a cushiony feel while still providing protection for the glass layer 144. In an embodiment, the flexible protective layer 142 can be positioned a small distance above the glass layer 144, to allow the flexible protective layer 142 to flex or give slightly before contacting the glass layer 144. The glass layer 144 can provide a rigid structure for the table top 102 and can be transparent.

While many textiles are contemplated for use as a play surface 140 in the present embodiment, their primary attributes should be to allow a player to view a static, dynamic, video, or multimedia presentation as projected by projector 136, to provide sufficient padding so as to properly facilitate the playing of the associated game, and to be sufficiently uniform and level so as to properly facilitate the playing of the associated game. Such textiles might include felt, linen, polyester blends, wool or wool blends, fleece, cotton or cotton blends, polypropylene, or other natural or synthetic or blended textile materials. It is further contemplated that such textiles may have a base color, such as green, that is visible when the projector 136 is off. In another embodiment, the textile material may be mostly colorless, such as white, when the projector 136 is off. It is specifically contemplated that white or colorless textile materials, such as felt, provide specific benefits in relation to allowing projected images to be shown through, while also closely replicating traditional table game surfaces. In an embodiment, flexible protective layer 142 is comprised of urethane material. In a different embodiment, flexible protective layer 142 is comprised of a different elastomer material. In a different embodiment, flexible protective layer 142 is comprised of plastic material. In a further embodiment, glass layer 144 is comprised of plexiglass.

In one or more embodiments, the play surface 140 can be positioned on a flexible protective layer 142 and/or glass layer 144 that is substantially transparent. In one or more embodiments, the display assembly 132 can include a play surface 140 and a flexible protective layer 142 or a glass layer 144. In one or more embodiments, the flexible protective layer 144 can be rigid. In one or more embodiment, the display assembly 132 can include the play surface 140 and one or more transparent layers that can support the play surface 140 while a game is played on the play surface 140.

The play surface 140 can be at least a portion of the upper surface 104 of the table top 102 and can define at least a portion of the game play area 106. The play surface 140 can be white and can allow light (represented by arrows 150) from the projector 136 to transfer through the play surface 140. The play surface 140 can provide a surface texture that cooperates with the feel and handling of physical game components, such as cards during card games. The play surface 140 can include a waterproof or water-repellent treatment that resists absorption and/or discoloration from liquids which may be spilled on the play surface 140. The water-repellent treatment may be StainSmart® provided by Milliken™ or other water repellent treatment that resists absorption and/or discoloration and which can allow the play surface 140 to remain soft/supple while not excessive effecting the color of the felt or light transfer through the play surface 140. In another embodiment the play surface 140 may comprise a netlike structure, material or treatment.

The projector 136 can project the light 150 on the display assembly 132. The light 150 produced by the projector 136 can pass through the glass layer 144 and the flexible protective layer 142 to the play surface 140. The play surface 140 can be translucent in that the play surface 140 can receive the light 150 from the projector 136 on the side facing the projector 136 and the play surface 140 can produce images 118 from the light 150 in the display area 116 on the opposite side of the play surface 140. In this way the projector 136 and display assembly 134 can produce the images 118 on the upper surface 104 of the play surface 140 for viewing in the display area 116 of the game play area 106. In one or more embodiments, the game play area 106 can be entirely or substantially entirely the display area 116.

The projector 136 can be a high definition projector that has a relatively short focal length. The focal length can be short enough to allow the projector 136 to be mounted in the table game system 100 at or above a floor 152 with the table top 102 at or near a normal table game height. In one embodiment, the table top 102 can be approximately 980 mm above the floor. In one embodiment, the table top 102 can be approximately 2100 mm wide and approximately 1100 mm deep. In one or more embodiments, the table top 102 can be higher or lower than 980 mm above the floor 152. The table top 102 can have sufficient width and depth to allow player/dealer interaction. In one or more embodiments, the table top 102 can be at a height that is comfortable for the player when the player is sitting on a chair or standing next to the table top 102. In one or more embodiments, the projector 136 can be an ultrashort focus projector that can project a screen size of about 90 inches with a brightness of 4000 lumen or more and can have a focal length of about 900 mm. In one or more embodiment, the projector 136 can be a Full High Definition (FHD) projector, such as for example, an Epson® PowerLight 700U or the projector 136 can be a projector having a higher resolution than the resolution of a FHD. In one or more embodiments, the projector 136 can be a commercially available digital projector, including but not limited to, a liquid crystal display (LCD) projector, a digital light processing (DLP) projector with a single chip or three chips, a liquid crystal on silicon (LCoS) projector, a multi-LCD laser light source projector, or any other digital projector offering good resolution and a suitable focal length.

The projector mount 138 can position the projector 136 at a mounting angle (represented by arrow 154) relative to vertical, as shown in FIG. 2. By mounting the projector 136 at mounting angle 154, the projector 136 can be positioned more toward a player side 156 which can allow the table game system 100 to be arranged so that the dealer can be closer to the game play area 106. This allows the dealer to more easily reach the game play area 106 and game play elements, such as cards or chips that are on the game play area 106. In one or more embodiments, the mounting angle 154 of the projector 136 can be approximately 24 degrees from vertical. In one or more embodiments, the mounting angle 154 of the projector 136 can be, for example, from 20-30 degrees from vertical. The mounting angle 154 of the projector 136 can depend on the size of the projector 136. In other embodiments, the mounting angle 154 is between zero and ninety degrees from vertical, or any suitable angle that enables the projector 136 to project light to the glass layer 144 such that images from the light are transmitted through the glass layer 144 and the flexible protective layer 142 and are displayed on the play surface 144.

The table top 102 can have a curved shape along the table top edge 110 on the player side 156 and can be shaped similar to a traditional blackjack table or other traditional or new style of wagering game table. The display area 116 can cover the entire game play area 106 and can include a curved shape that substantially matches the curved side edge 110 of the table top 102. The projected image 118 can cover the entire game play area 106 and can have the curved shape to match the curve of the table top 102. By projecting the image 118 to the display assembly 132, the image size and shape is not limited to a single size and shape, but instead can be changed for different games or different table top shapes. The projected image 118 can have a background image **118*a* and can have game image elements 118*b* that can depend on the game play. The play surface 140, and the support layers 142 and/or 144 of the display assembly 132 can be shaped to correspond to the shape of the table top 102. In one or more embodiments, the display assembly 132 can include one or more curved edges and/or one or more straight edges. In one or more embodiments, the table game system 100 can include under table lighting 158, such as a color changeable LED lighting, under the table top edge 110. The under table lighting 158 can be used for attracting players to the table gaming system 100** by producing visual interest.

Figure 3:
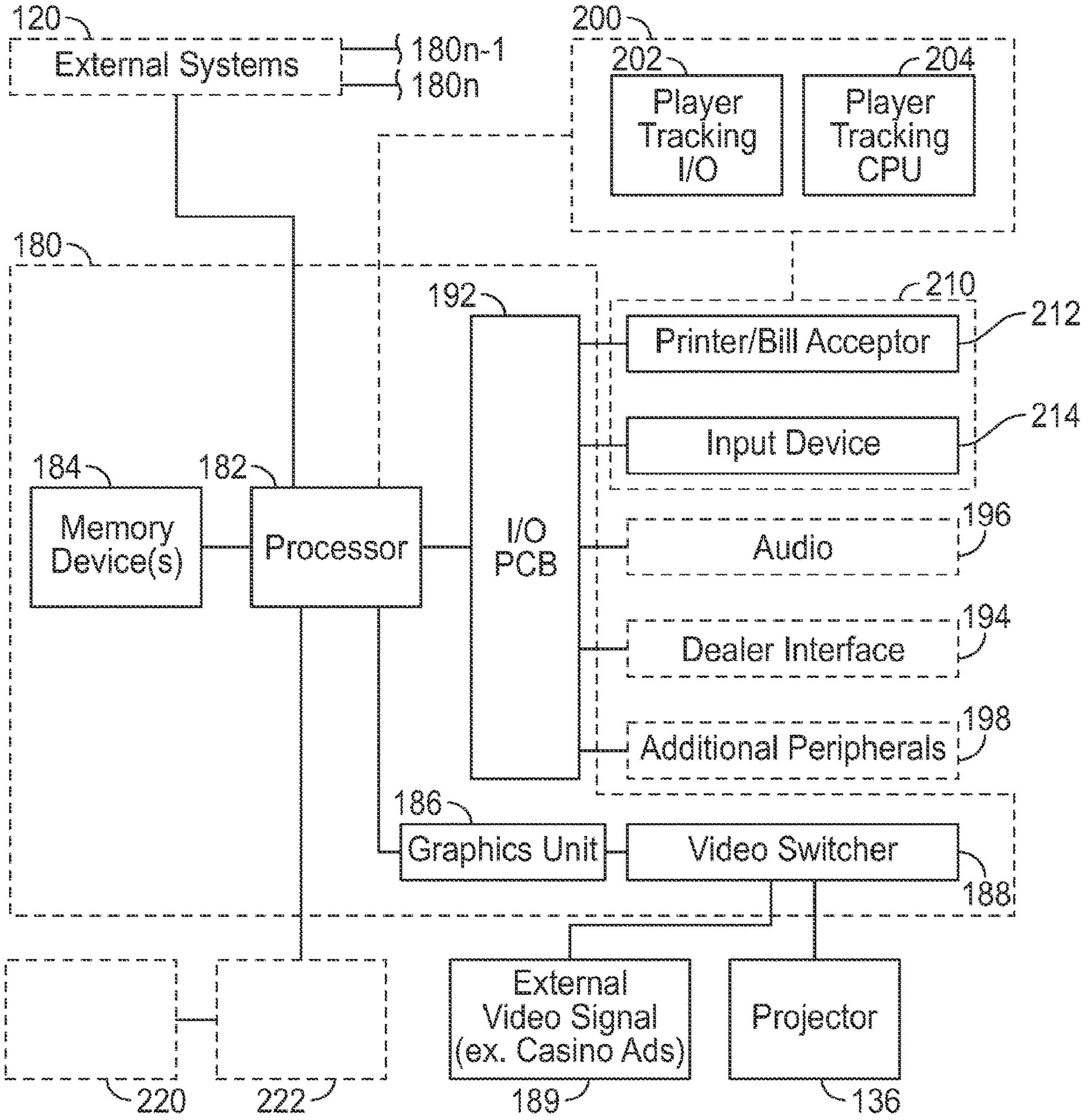
FIG. 3 depicts a schematic diagram of a processing system of the table game system, according to one or more embodiments.

FIG. 3 depicts a schematic diagram of a processing system 180 of the table game system 100, according to one or more embodiments. The processing system 180 can comprise a processor 182, a memory 184, and a graphics unit 186. The processing system 180 can be configured to run one or more game programs which can be stored in the memory 184, and can communicate with the dealer station 112. The processing system 180 can send media data to the projector 136 through the graphics unit 186 for displaying the images 118 on the display area 116 of the table top 102. Processing system 180 can include a video switcher 188 which can be used for switching between different media data sources. In some embodiments, the video switcher 188 can route media data from the graphics unit 186 to the projector 136, such as during game play. In some embodiments, the video switcher 188 can route media data from an external video signal source 189 to the projector 136, for example to display 3.sup.rd party advertising or other advertising using the projector 136 while a game is not being played.

The table game system 100 can house all or part of the processing system 180 inside and secured against unauthorized access. In one or more embodiment, the processing system 180 can be a single board processing system which includes all of the components electrically connected to one another on a single printed circuit board (PCB). In one or more embodiments, the processing system 180 can include multiple electronic devices, some of which can be grouped together on one or more PCB and other of which may be on a separate PCB and which may be connected through one or more cable or bus. In one or more embodiment, one or more component of the processing system may be or include an application specific integrated circuit (ASIC).

The processor 182 may comprise a central processing unit (CPU), such as a processor integrated circuit (IC), a microprocessor, multiple processors which may operate in parallel, and/or other types of processors that can perform arithmetic and logical operations and which also can extract instructions from one or more memory device and execute the instructions.

The memory 184 can include one or more distinct types of memory devices, such as random access memory (RAM) or dynamic RAM (DRAM), which can include nonvolatile RAM (NVRAM), magnetic RAM (MRAM), ferroelectric RAM (FeRAM) and other forms. In one embodiment, the memory 184 can include read only memory (ROM), which may, for example, store regulatory-sensitive instructions for the table game system 100. In one embodiment, the memory 184 can include flash memory and/or EEPROM (electrically erasable programmable read only memory). The memory 184 may also comprise other suitable magnetic, optical, semiconductor memory and/or other electronic memory that may operate in conjunction with the table game system 100 disclosed herein.

In some embodiments, memory 184 can store program code that is executable by processor 182. Memory 184 may also store operating data, such as a random number generator (RNG), game instructions, event data, display files, game history data, and other such data and instructions that allow for a gaming device to properly function in a regulated environment.

The graphics unit 186 can include a graphic processing unit (GPU), which is electronically connected to the processor 182 and can work in coordination with the processor 182 to control the projector 136. The graphics unit 186 can include one or more graphics cards which can each include a GPU. In one or more embodiment, the graphics unit 186 can be part of the same ASIC as the processor 182 or can be on the same PCB as the processor 182. In one or more embodiment, the graphics unit 186 can be a graphics card which can be electronically connected to the processor 182 through a connector.

In the present example, processor 182 is communicatively connected to at least one input/output (I/O) device 192 which operates as an electrical interface between the processor 182 and various peripherals of the processing system 180 and/or table game system 100. The I/O device 192 can be a separate IC from the processor 182 or can be part of the same IC as the processor 182. The I/O device 192 can be on the same or on a different PCB from the processor 182.

The dealer station 112 (FIG. 1) can include a dealer interface 194 (FIG. 3) and the I/O device 192 can interface between the dealer interface 194 and the processor 182. The dealer interface 194 can comprise a touchscreen device 196 (FIG. 1) which can display controls and can accept input from the dealer to manipulate the controls through touching a screen of the touchscreen device. The dealer interface 194 can control what is displayed on the display area 116 of the table top 102. Through the dealer interface 194, the dealer can select advertisements, seasonal displays, such as for example, Christmas or other holiday themes to be displayed on the display area 116. The dealer interface 194 can also be used by the dealer to display game information, such as for example, minimum bets, side bets, game instructions, and/or the type of game. In one or more embodiments, the dealer interface 194 can be used to access regulated items which may alter bets and/or payouts. Some functionality of the dealer interface 194 may be access-controlled, such as by passcode, biometric authentication, or other securing method. In one or more embodiments, the dealer interface 194 can have different levels of access. In an example, the dealer interface 194 could have a relatively lower level of access for dealers who could use the access to change non-game determinative graphics, and could have a relatively higher level of access which could allow a person to change game-determinative graphics that are displayed on the display area 116.

In one or more embodiments, the dealer interface 194 can be passive and can show relevant information about what is being displayed on the display area 116 of the table top 102 and/or what is going to be displayed next. In one or more embodiments, the dealer interface 194 can include a keyboard and display that can be used to input controls. In another embodiment, the dealer interface 194 can include another type of control input, such as a touchpad, mouse or other device. The table game system 100 can include other peripherals 198, besides or in addition to the dealer interface 194. For example, the table gaming system can include an audio system 196 which can include one or more speakers that can provide audio effects which can be associated with a game while played, with another displayed image and/or can be independent of the displayed image. The audio system 196 can communicate commands, game events to the game player, non-game audio information and/or entertainment type audio. In one or more embodiments, the audio system can be controlled by the processing system 180 of table game system 100 and/or by the external system 120.

The table game system 100 can be a stand-alone system that is not connected to an external system, or can be part of a control-client system in which the table game system 100 is a client system that can communicate with external control system 120 to receive instructions or control data. The table game system 100 can be a stand-alone system in which the table game system operates and controls its own function and does not interface with an external control system. In the control-client system, the table game system 100 can be configured to have relatively more or less autonomy from the control system 120. In one embodiment, the table game system 100 can be one of two or more table game system 100 that are communicatively connected to a single external control system 120. In one embodiment, the table game system 100 can be one of up to ten client table game systems 100, controlled by a single external control system 120.

In one or more embodiments, the processing system 180 can connect to and control multiple projectors 136. Each of the multiple projectors 136 can be located in a single table game system 100, one or more of the multiple projectors 136 can be located in one table game system 100 while others of the multiple projectors 136 can be located in one or more other table game systems 100. In one or more embodiments a single processing system similar to processing system 180 can control multiple projectors 136 and can be located remote from the multiple projectors 136.

The external system 120 can be positioned in a secure location that is not accessible by the players. The external control system 120 can send game specific information to one or more client system **180*n* and can send different information or the same information to the client systems 180*n* at the same or at different times. In one embodiment, the external control system 120 can load game specific information into the client systems 180*n*. In one embodiment, the external control system 120 can load game specific information for different games into a single client system 180*n* at different times. In one embodiment, a dealer can request a game to be loaded into a specific client system from the client systems dealer station, and the dealer station can communicate the request to the processing system of the client system which can then send the request to the external control system 120. The external control system 120 can then operate to send the data for the requested game to the requesting client processing system, or can deny the request and not send the data for the requested game. In one or more embodiments, the external control system 120 can store regulatory-sensitive instructions or information in a controlled central location, such as for example, at a pit bosses station or a secured room or area of the casino. The external system 120** can include one or more of an accounting system, player tracking system, player bonusing system, player assistance system, server-based gaming system or other game content management system, wide area network (WAN), local area network (LAN), the internet, or other communication systems.

The table game system 100 can also include a player tracking device 200. The player tracking device 200 can include a distinct player tracking input/output (I/O) 202 and player tracking processor 204 as well as associated player tracking memory (not shown). In one embodiment, the player tracking device can be connected to the processor 182 of the processing system 180. In one or more embodiments, it is contemplated that player tracking device could have a direct line of communication with a printer/bill acceptor. In such an embodiment, the player tracking device 200 could then cause the ticket printer to print out promotional tickets without having to first communicate with the processing system, which may be desirable from a regulatory view.

FIG. 3 further illustrates an exemplary embodiment where processor 182 communicates with additional peripherals 198, and player station 210. In the illustrated example, player station 210 comprises a printer/bill acceptor 60 and an input device 45. It is contemplated that in some embodiments, use of a printer/bill acceptor 60 and/or an input device may allow operators to do away with traditional betting chips as are common on typical table games. This could provide numerous benefits to operators, including improving security as then all wagers and payouts can be tracked electronically. This can also provide a cleaner table surface playing of the associated game, as there are no chips that may be accidentally hit by moving game components, such as cards. It is also contemplated that similar benefits could be derived from a system where the player station 210 does not include a printer/bill acceptor 60 and/or input device 45, but rather the dealer interface 194 does. In such an embodiment, a player could hand their money to the dealer/attendant, who inputs the transaction into dealer interface 194, which could then cause the appropriate player station 210 to be credited with the proper amount of credits, which the player can then use to wager and play with.

Figure 4A:
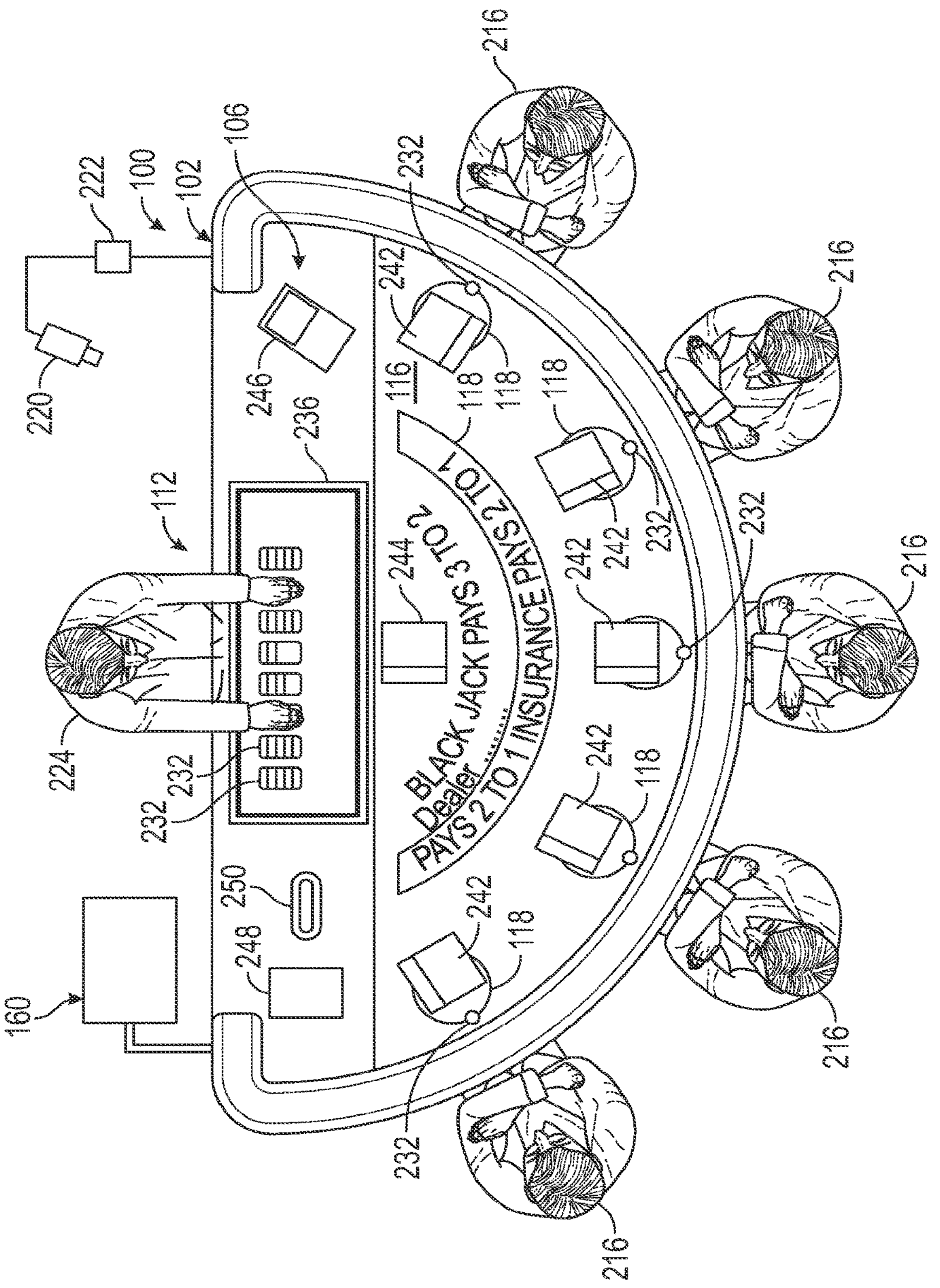
FIG. 4A depicts a plan view of a table game system, in accordance with one or more embodiments.

FIG. 4A depicts a plan view of the table game system 100 in which the display area 116 of the table top 102 is displaying a standard blackjack game, in accordance with one or more embodiments. As shown in FIG. 4A, images 118 displayed in the display area 116 can identify the name of the game being played, can show some or all of the rules of the game being played, can show players 216 where to place player cards 242 and/or chips 232, and/or other information. The images 118 can also show where to place cards 244 for a dealer 224. Also shown in FIG. 4A is a shoe 246 with cards for dealing during the game, discarded cards 248, and a currency slot 250, and a chip tray 236 which can be used for storing the chips for the dealer 224.

The table game system 100 can include a video camera 220 that can be positioned so that it can capture images of dealt cards in the game play area 106. The video camera 220 can be in communication with the processing system 180 and may be connected as an additional peripheral 198 to the processor 182 through the I/O device 192. In one or more embodiments, the video camera 220 can operate through a card detection unit 222 which may be part of the processing system 180 or separate from the processing system 180. In another embodiment, the video camera 220 can include connection to the external control system 120. The video camera 220 can be used in keeping track of cards that are dealt to the players and to the dealer 224. In an embodiment, the table game system can include a dealer camera that can view the dealer's cards.

In an example, the card detection unit 222 is configured to receive the video input from the video camera 220, process video image files, determine both the rank and suit of the dealt card, and then communicate such details to processing system 180 and/or external control system 120. In a further embodiment, the card detection unit 222 is communicatively connected to further devices utilized to detect the dealt playing cards, such as additional cameras, RFID readers, smart card shoes which are configured to read the cards as they are taken from the card shoe, or any combination thereof. In another embodiment, the card detection unit 222 is itself a smart card shoe which reads the cards as they are taken from the card shoe, and communicates the identification of the dealt card to the processing system 180 and/or external control system 120. In a further embodiment, the card detection unit 222 is a part of video camera 220 and shares a common housing. The various components of the of the card detection process, as disclosed herein, may be collectively referred to as a card detection system, and should be understood to encompass both the physical hardware and associated programming for automatically recognizing the attributes (e.g., rank and suit) of a dealt physical card.

Figure 4B:
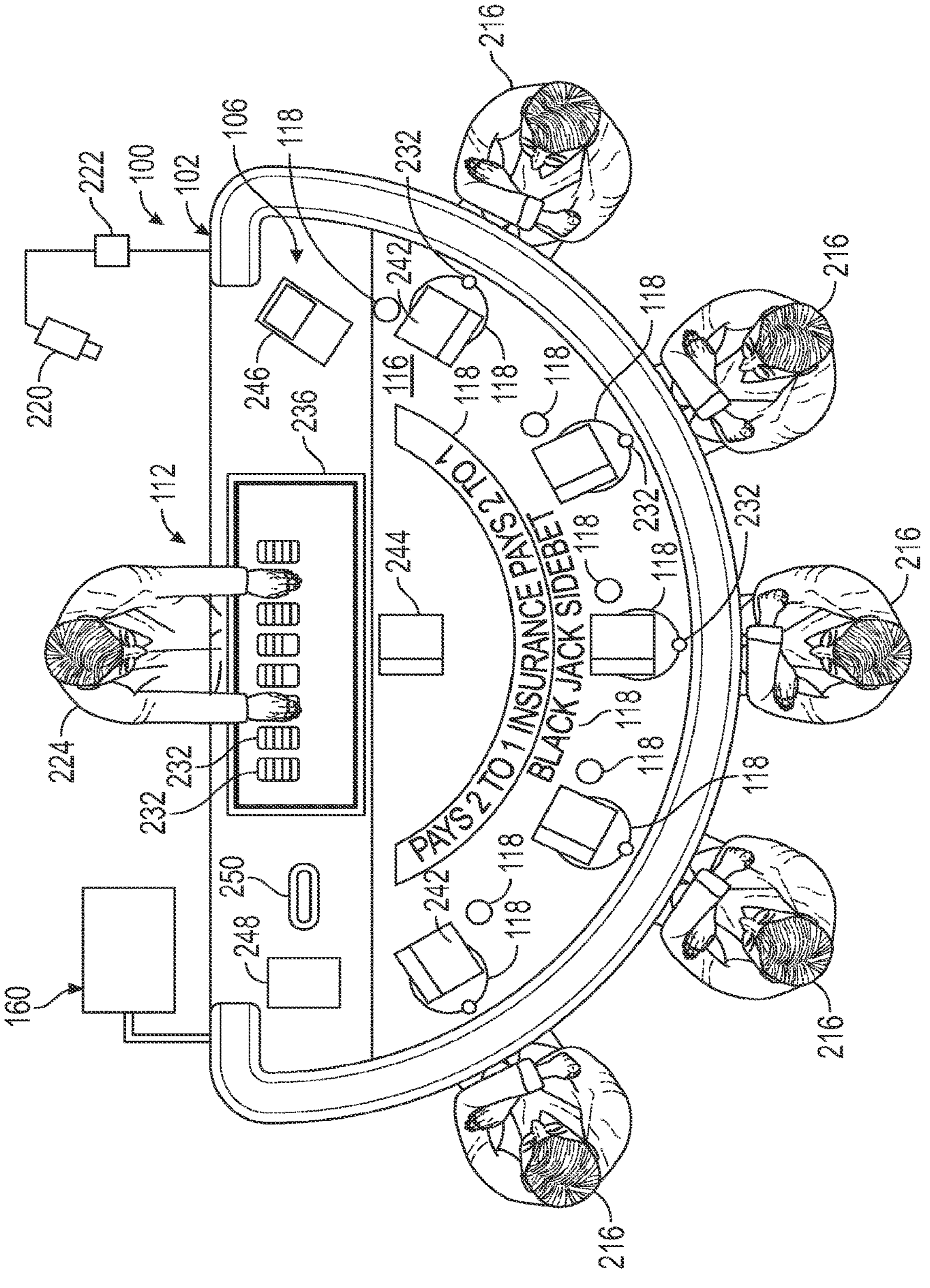
FIG. 4B depicts another plan view of a table game system, in accordance with one or more embodiments.

FIG. 4B depicts a plan view of the table game system 100 in which the display area 116 of the table top 102 is displaying a blackjack game with a sidebet, in accordance with one or more embodiments. As shown in FIG. 4B, images 118 displayed in the display area 116 can identify the game being played, and can include one or more sidebet graphics which can indicate a sidebet game and can show players 216 where to place bets for a sidebet game.

Figure 4C:
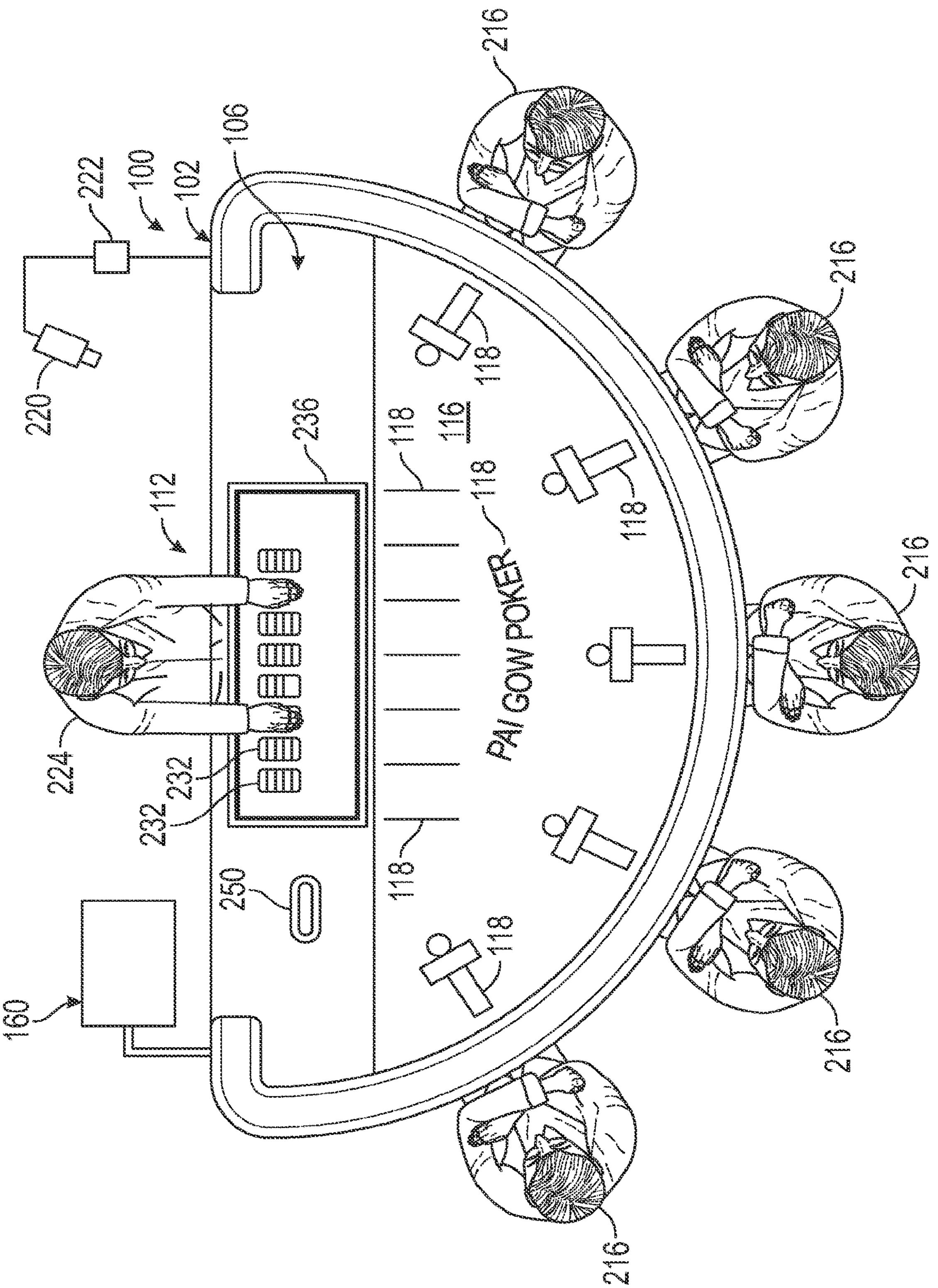
FIG. 4C depicts another plan view of a table game system, in accordance with one or more embodiments.

FIG. 4C depicts a plan view of the table game system 100 in which the display area 116 of the table top 102 is displaying a Pai Gow Poker game, in accordance with one or more embodiments. As shown in FIG. 4C, images 118 can relate to the Pai Gow Poker game, as another example of games that can be played in the table game system 100 by changing the images displayed in the display area 116 of the table top 112. The table game system 100 allows the casino to change the games played without having to replace the table. By having a table that can display different games, such as table game system 100, the casino can quickly change games without having to move and replace the table. The casino can control which games are displayed and played on any particular table game system 100 individually or collectively, and can control the game displayed at each table game system 100, or by central control remote from the table game system 100.

Figure 4D:
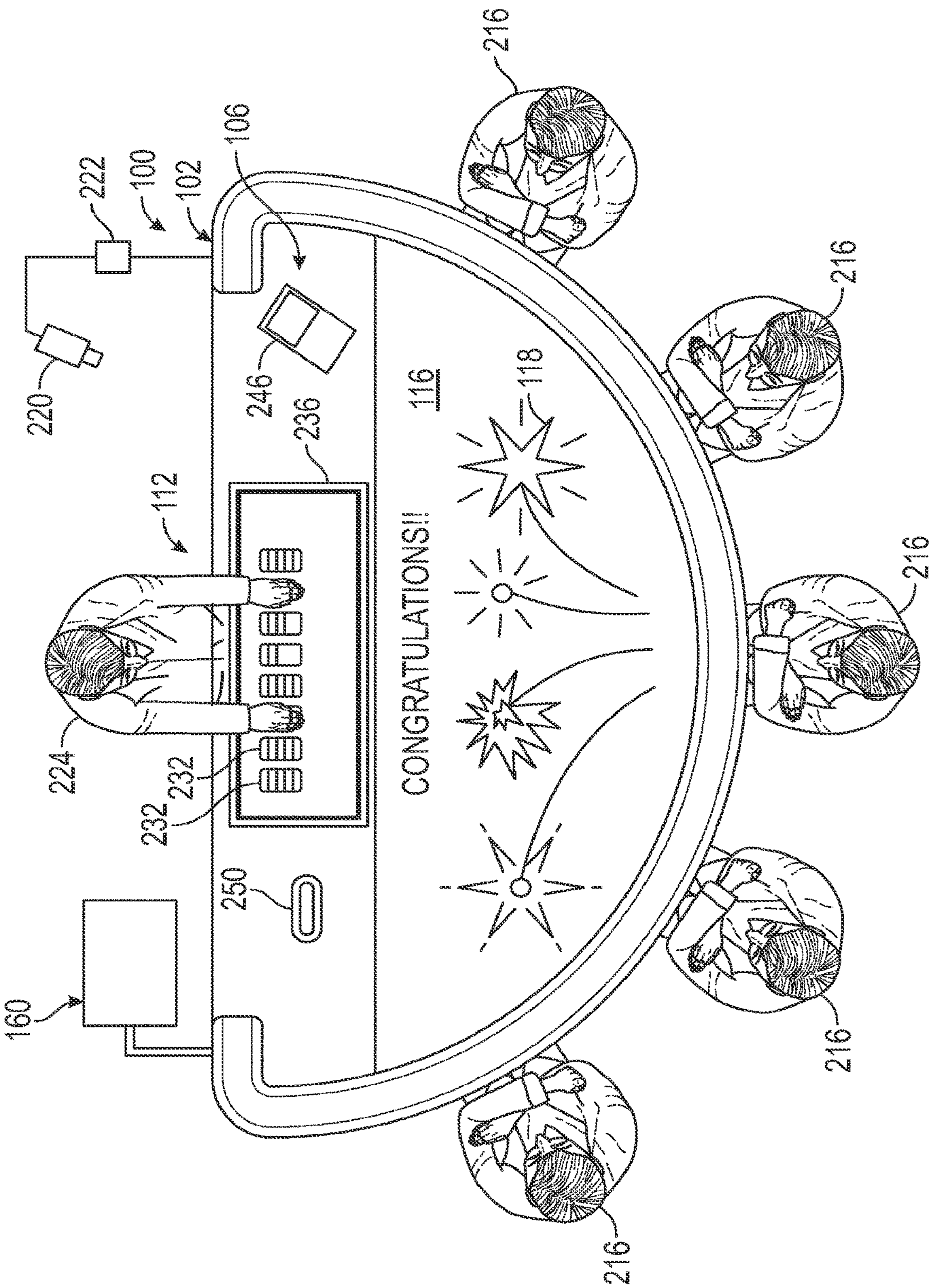
FIG. 4D depicts another plan view of a table game system, in accordance with one or more embodiments.

FIG. 4D depicts a plan view of the table game system 100 in which the display area 116 of the table top 102 is displaying another image, in accordance with one or more embodiments. Table game system 100 can display images 118 that can congratulate a player 216 when they have won the game. In one or more embodiments, the image 118 can be animated. In one or more embodiments, the image 118 can say "Congratulations" and can include a display of fireworks images 118 when a player 216 wins. In one or more embodiments, the image 118 can show other things that can be used to congratulate a winning player.

Figure 5:
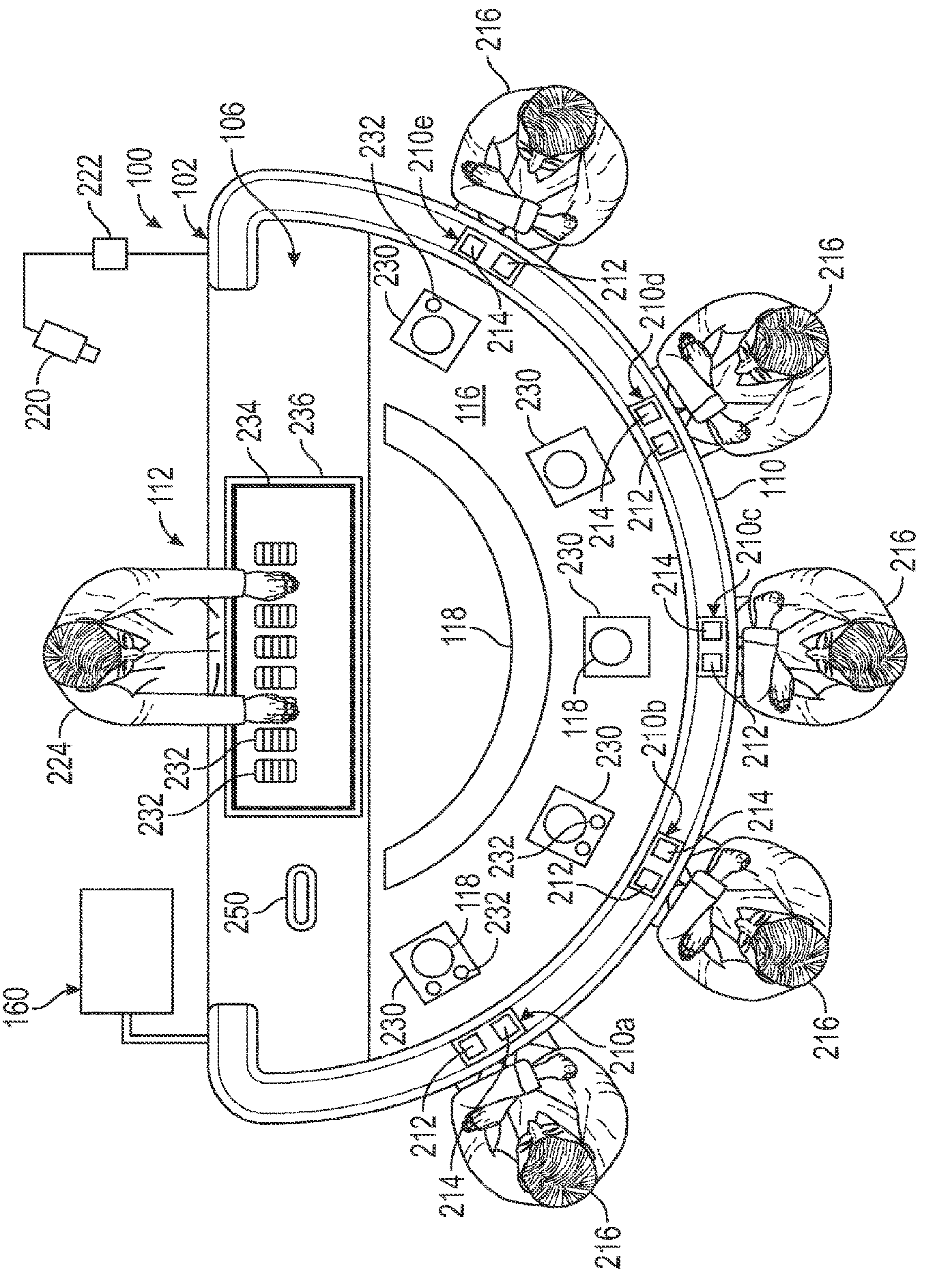
FIG. 5 depicts another plan view of a table game system, in accordance with one or more embodiments.

FIG. 5 depicts a plan view of a table game system 100, in accordance with one or more embodiments. In one or more embodiments, the table game system 100 can include one or more player stations 210. The player stations can be positioned around the perimeter of the table top 102, such as along the table top edge 110. Each of the player stations 210 can include a printer/bill acceptor 212 and an input device 214. Each of the player stations 210 can be arranged to allow an associated player 216 to utilize the player station 210 while also having the ability to view and access the game play area 106. In an embodiment, each player station 210 comprises a printer/bill acceptor 212. In this example, the printer/bill acceptor 212 is configured to accept tangible mediums of currency, such a physical/paper bills and tickets. In another embodiment, printer/bill acceptor 212 may be comprised of multiple components, such as a separate currency acceptor and printer. In such an embodiment, the currency acceptor may be a coin acceptor that accepts coins. In still another embodiment, the player stations 210 each include more than one currency acceptor, such as one for coins, one for paper bills, and/or one for tickets. In another embodiment, printer/bill acceptor can accept multiple denominations of currency, or even currencies from multiple countries. In still another embodiment, printer/bill acceptor 212 can accept a ticket or similar physical indicium that is distributed by a casino or another gaming machine, which indicates an amount of currency available for wagering. In a further embodiment, printer/bill acceptor 212 can accept credit cards, debit cards, prepaid cards, or other instruments to initiate an electronic funds transfer. It is also contemplated that instead of a printer/bill acceptor 212, the table game system provides another means to allow a player to access money in order to wager on a play of the game. For example, the player 216 may enter a personal identification number (PIN) in order to access an account they have, either with a bank or the casino itself, and upon entering the PIN and other information, certain amount of funds are transferred to the player station 210 or otherwise allowed to be wagered in relation to the table game system 100. In another embodiment, printer/bill acceptor 212 is configured to interact with a radio frequency identification (RFID), a Bluetooth, a near-field communication (NFC), a WiFi, and/or other short-range or medium-range communication device which can transmit financial information short and/or medium distances, for example a bracelet, smart watch, smart phone, or other similar devices.

The player station 210 can also include the input device 214, such as touch display, which allows the player 216 to input commands, such as placing a wager on a play of the table game. In another embodiment, player station 210 includes other input devices, such as physical buttons. In a further embodiment, touch display is a multi-touch display. In another embodiment, the player station 210 can display information through the display system 130 to produce images 118 on the table top 102, such as for example, images relating to wager information, the player's name and/or other information.

The player tracking device 200 can be part of and/or connected to one or all of the player stations 210. In this example, the player station 210 includes a player tracking card reader, and a player information display. It is contemplated that such a player information display can be incorporated as part of the display area 116 on the table top 102 of the table game system 100. The player information display can be utilized to communicate with the player 216. It is also contemplated that such player information display can be separate from the display area 116 and can be a liquid crystal display (LCD), a plasma display, an electroluminescent (EL) display, an organic light emitting diode (OLED) display, an LED dot matrix type of display, or can be any other type of display suitable for smaller displays. It is contemplated that player station 210 can include a visibly distinct player tracking device, or a visually integrated player tracking device that utilizes a portion of display area 116 and possibly also an associated touch display of the player station 210 in order to interact with a player 216. In practice, a player 216 makes their identity known to the player tracking device 200, either actively by inserting a player tracking card into a player tracking card reader and/or entering a PIN into an associated keypad or a touch interface incorporated with the player information display, or passively by utilizing a location device, such as an RFID tag, a Bluetooth, a near-field communication (NFC), a WiFi, and/or other short-range or medium-range communication device which can transmit information short and/or medium distances, for example a bracelet, smart watch, smart phone, or other similar devices. Thereafter, the player tracking device can communicate over a network with a casino tracking system to track a player's play, and potentially offer awards or other services to the player, often through the same player tracking device. The player tracking device can also display, via player information display, player status information back to the player, or other information based on or otherwise related to a player's play history and/or status, including awards earned by a player. It is also contemplated that the networked player tracking device can be utilized to offer other services to players, such as the ordering of drinks, or making promotional offers to a player, perhaps working in coordination with printer/bill acceptor to do so.

In one or more embodiments, the table game system can include one or more table RFID sensor 230 in the table top 102 which can sense RFID tags in casino chips 232 or tokens. The table sensor 230 can sense or otherwise determine bet amounts and/or locations or bets by sensing the chips RFID tag which can be coded with chip value. The table sensor 230 can determine a players bet by the amount of the chip value from the RFID tags, and the location of the chips 230. The table game system 100 can also include one or more chip tray RFID sensor 234 which can be located in the chip tray 236 of the table game system 100. The chip tray sensor 234 can be used with RFID chips to ensure chip counts in the chip tray 236 for security purposes and/or to maintain a certain minimum or maximum value of chips 232 in the chip tray 236 during game play. The table sensor 230 and/or the chip tray sensor 234 can be electronically connected to the processing system 180 as a peripheral 198 or otherwise, and/or can be connected to the external control system 120 for tracking the chips 232 during gameplay. In one embodiment, the dealer station 112 can be configured to allow the dealer 224 to input game results, and the processing system 180 can be used to calculate wins based on the RFID location and value of bets using the table sensor 230 and RFID chips 232.

The table game system 100 disclosed herein allows casinos to implement electronic table game functions while retaining the tactile feel of traditional table games. The table game system allows the casino to quickly and cheaply modify the games on the casino floor while still providing the game players with the feel of physical cards, chips and a felt game play area surface.

Software implementing particular embodiments may be written in any suitable programming language (which may be procedural or object oriented) or combination of programming languages, where appropriate. Any suitable type of computer system (such as a single- or multiple-processor computer system) or systems may execute software implementing particular embodiments, where appropriate.

Further examples are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the present disclosure.

A game system comprising: a table top having a substantially horizontal upper surface with a game play area; a table support for supporting the table top; a dealer station adjacent to at least one side of the game play area, the dealer station including a dealer interface for supporting game play of the gaming system, a chip tray for holding chips, and a drop box; a display that covers at least a portion of the game play area, the display comprising a glass layer, a flexible protective layer, and a play surface and wherein the play surface is positioned on top of the flexible protective layer, and the flexible protective layer is positioned on top of the glass layer, and wherein the play surface is white and includes a waterproof treatment, the display comprising at least one curved edge; a projector assembly, the projector assembly including a projector and a projector mount that mounts the projector to the support frame at an angle of approximately 24 degrees from vertical, the projector configured to project light to the glass layer such that images from the light are transmitted through the glass layer and the flexible protective layer and are displayed on the play surface on the opposite side from the flexible protective layer; and a processing system connected to the projector and the dealer station, the processing system comprising a processor, a memory, and a graphics unit, the processing system configured to run a game program stored in the memory and to send media data to the projector assembly through the graphics unit for display as game play images on the game play area during game play.

What is claimed:

1. A game system comprising:

a table top having a substantially horizontal upper surface with a game play area;

a table support for supporting the table top;

a dealer station adjacent to at least one side of the game play area;

a display assembly that defines at least a portion of the game play area, the display assembly comprising a glass layer;

a projector mounted to the table support under the table top at a mounting angle that enables the projector to project light to the glass layer such that images from the light are transmitted through the glass layer; and a processing system in communication with the projector and the dealer station, the processing system comprising a memory and a processor, the processing system configured to cause the projector to change the images based on input received by the dealer station.

2. The game system of claim 1, wherein the mounting angle is one of (i) less than thirty-one degrees from vertical, or (ii) between nineteen and thirty-one degrees from vertical.

3. The game system of claim 1, wherein the display assembly comprises a play surface including one or more of felt, linen, polyester, wool, fleece, cotton, or polypropylene.

4. The game system of claim 1, wherein the glass layer is comprised of plexiglass.

5. The game system of claim 1, wherein the mounting angle is twenty-four degrees from vertical.

6. The game system of claim 1, wherein the display assembly comprises at least one curved edge.

7. The game system of claim 1, wherein the display assembly further comprising a flexible protective layer on top of the glass surface, wherein the flexible protective layer comprises a transparent material.

8. The game system of claim 1, wherein the projector comprises a Full High Definition (FHD) projector or a projector with a resolution higher than a resolution of a FHD projector.

9. A game system comprising:

a table top having a substantially horizontal upper surface with a game play area;

a table support for supporting the table top;

a dealer station adjacent to at least one side of the game play area;

a display assembly that defines at least a portion of the game play area and having a curved edge, the display assembly comprising a glass layer;

a projector and a projector mount that mounts the projector to the table support at a mounting angle between zero and ninety degrees from vertical, the projector configured to project light to the glass layer such that images from the light are transmitted through the glass layer; and a processing system in communication with the projector and the dealer station, the processing system comprising a memory and a processor, the processing system configured to cause the projector to change the images based on input received by the dealer station.

10. The game system of claim 9, wherein the display assembly comprises a play surface positioned on top of the glass layer, and wherein the images are displayed on the play surface and cover the entire game play area.

11. The game system of claim 9, wherein the display assembly comprises a play surface positioned on top of the glass layer, and wherein (i) the table top defines a shape, (ii) the play surface defines a shape, (iii) the support layer defines a shape, (iv) the display assembly defines a shape, and (v) the shapes defined by the play surface, the support layer, and the display assembly each correspond to the shape defined by the table top.

12. The game system of claim 9, wherein the input received by the dealer station includes input for to at least one of (i) advertisements, (ii) seasonal displays, or (iii) game information.

13. The game system of claim 9, wherein the input received by the dealer station is received via a touchscreen, a mouse, or a keyboard.

14. The game system of claim 9, wherein the display assembly further comprising a flexible protective layer on top of the glass surface, wherein the flexible protective layer is positioned a distance above the glass layer to allow the flexible protective layer to flex without contacting the glass layer.

15. The game system of claim 14, wherein the display assembly comprises a play surface positioned on top of the flexible protective layer, and wherein the play surface comprises one or more of felt, linen, polyester, wool, fleece, cotton, or polypropylene.

16. The game system of claim 9, wherein the display assembly comprises a play surface positioned on top of the glass layer, and wherein the play surface is translucent and positioned to receive the images from the light on a side of the play surface facing the projector.

17. A game system comprising:

a table top having a substantially horizontal upper surface with a game play area;

a table support for supporting the table top;

a dealer station adjacent to at least one side of the game play area;

a display assembly that defines at least a portion of the game play area and having a curved edge, the display assembly comprising a glass layer;

a projector configured to project light to the glass layer such that images from the light are transmitted through the glass layer; and a processing system in communication with the projector and the dealer station, the processing system comprising a memory and a processor, the processing system configured to cause the projector to display images of a first game at a first time, the first game having first game rules, and to display images of a second game at a second time, the second game having second game rules that are different than the first game rules.

18. The game system of claim 17, wherein the processing system includes a video switcher and a graphics unit, the video switcher configured to route media data from the graphics unit to the projector during play of at least one of the first game or the second game.

19. The game system of claim 17, wherein the processing system includes a video switcher configured to (i) route advertising data to the projection when no game is being played, or (ii) switch between (a) delivering a first media data source to the projector and (b) delivering a second media data source to the projector, the first media data source different from the second media data source.

20. The game system of claim 17, wherein (i) the images of the first game include images having a first size and shape and the images of the second game include images having a second size and shape, and (ii) the first size and shape different from the second size and shape.

* * * * *